United States Patent [19]

Legrand et al.

[11] 4,442,987

[45] Apr. 17, 1984

[54] GUIDANCE DEVICE FOR THE MOVING FAIRING OF A THRUST REVERSER SYSTEM

[75] Inventors: Paul J. Legrand, Vaux le Penil; René M. J. Hersen, Combs la Ville, both of France

[73] Assignee: Societe Nationale D'Etude et de Construction de Moteurs D'Aviation "S.N.E.C.M.A.", France

[21] Appl. No.: 331,230

[22] Filed: Dec. 16, 1981

[30] Foreign Application Priority Data

Dec. 23, 1980 [FR] France ............................. 80 27281

[51] Int. Cl.³ .......................... B64D 33/04; F02K 1/54
[52] U.S. Cl. ........................... 244/110 B; 239/265.25; 239/265.31; 60/230; 60/226.2
[58] Field of Search .................... 244/110 B; 308/3 R, 308/4 R; 60/226 A, 230; 239/265.31, 265.25

[56] References Cited

U.S. PATENT DOCUMENTS

| | | | |
|---|---|---|---|
| 1,889,320 | 11/1932 | Peters | 308/3 R |
| 4,072,368 | 2/1978 | Ehrentraut | 308/3 R |
| 4,145,877 | 3/1979 | Montgomery | 60/226 A |

Primary Examiner—Trygve M. Blix
Assistant Examiner—Ivy M. Shum
Attorney, Agent, or Firm—Bacon & Thomas

[57] ABSTRACT

A guiding system of the movable fairing of a turbojet engine thrust reverser system comprising two guide pieces mounted on an upper frame fixed to a mast and pieces to be guided attached to the movable fairing. The guide pieces are provided with a groove of a circular cross section and the piece to be guided is a cylindrical body having, on a generatrix and in a radial plane, a flange, the end of which has means to fasten it to a fitting on the movable fairing.

8 Claims, 2 Drawing Figures

GUIDANCE DEVICE FOR THE MOVING FAIRING OF A THRUST REVERSER SYSTEM

BACKGROUND OF THE INVENTION

The invention concerns a guidance device for a thrust reverser system of a jet engine mounted on a mast comprising at least two guide pieces fastened to the upper frame integral with the mast and pieces to be guided fastened to a moving fairing.

The actuation of the thrust reverser system of certain turbojet engines is effected by the displacement by known means, such as jacks, of a section located in the rear part of the nacelle fairing.

The displacement toward the rear of the section has the effect of:

extending the reverser cascades retracted within the nacelle;

carrying along the closing means of a known type, such as blocker doors, to close off the secondary jet downstream from the reverser cascades;

redirecting in the upstream direction the entire flow of air coming from the fan, through the cascade.

This displacement results in a deployed position of the exhaust reverser system and furnishes a reverse thrust mode, when the section is moved toward the bow, the thrust reverser is in a forward thrust mode, in a stowed position.

The invention concerns more particularly the guidance device mounted between the mobile reverser cascades and a stationary part, such as the upper and lower frames of the nacelle integral with the mast from which the jet engine is suspended.

French Pat. No. 2,184,021 describes a guiding device for a cowling ring capable of varying the cross section of the jet pipe in a jet engine comprising a variable pitch fan. The ring is displaced so as to form an air inlet when the fan operates in reverse. The device contains two guide pieces or rails, parallel to the axis of the nacelle, attached to the mast and to each other by means of crossbraces, wherein the pieces to be guided and fastened to the ring are slidably guided. The pieces have a T-shaped part which engages in the guide rail.

The part of the rail cooperating with the T-shaped parts is covered by a plastic layer which assures tightness and ease of translational movement. Tightness is obtained by the pivoting of the T-shaped part under the weight of the ring, with the opposing edges of the transverse bar forming two lines of sealing contacts.

The functions of guidance and tightness are suitably assured by the above-described device, however, the ease of translation is doubtful, because it is necessary to overcome the contact forces developing along the two sealing lines.

French Pat. No. 2,132,380 eliminates this disadvantage, but at the price of increased complexity. Each half of the fairing carries two sets of inversion blading supported between two spars extending longitudinally. Sliding elements, having a T-shaped part, are attached to the upper spar of the upper blading and to the lower spar of the lower blading and cooperate with the slots provided in the upper and lower frame elements. The spars further carry a groove which cooperates with a wing of an actuating device to retain the bladings and to make possible their sliding. The wings of the actuating device play an important role only at the onset of the motion of the blades. When the blades arrive in their positions, only the elements sliding in the slots provided in the frame elements ensure the guidance and support of the weight of the blades and of the forces generated by the inversion of the gas flow.

In the final phase of the installation of the blades, difficulties similar to those found in the preceding patent, are encountered. Furthermore, no plastic coating is provided in the slots to facilitate displacement.

SUMMARY OF THE INVENTION

It is an object of the invention to provide a guidance device wherein friction is reduced to a minimum during sliding, while permitting limited rotating movements of the piece being guided, in the guiding device during operation. According to the invention, each of two pieces of the guiding device contains a groove with a circular cross section and each of the pieces to be guided comprises a circular body carrying on a generatrix and in a radial plane, a flange, the end of which carries means for its attachment to a fitting of the moving fairing.

BRIEF DESCRIPTION OF THE DRAWINGS

The explanations and figures given hereinafter as examples will make it more apparent how the present invention may be embodied.

DESCRIPTION OF A PREFERRED EMBODIMENT

Figure 1:
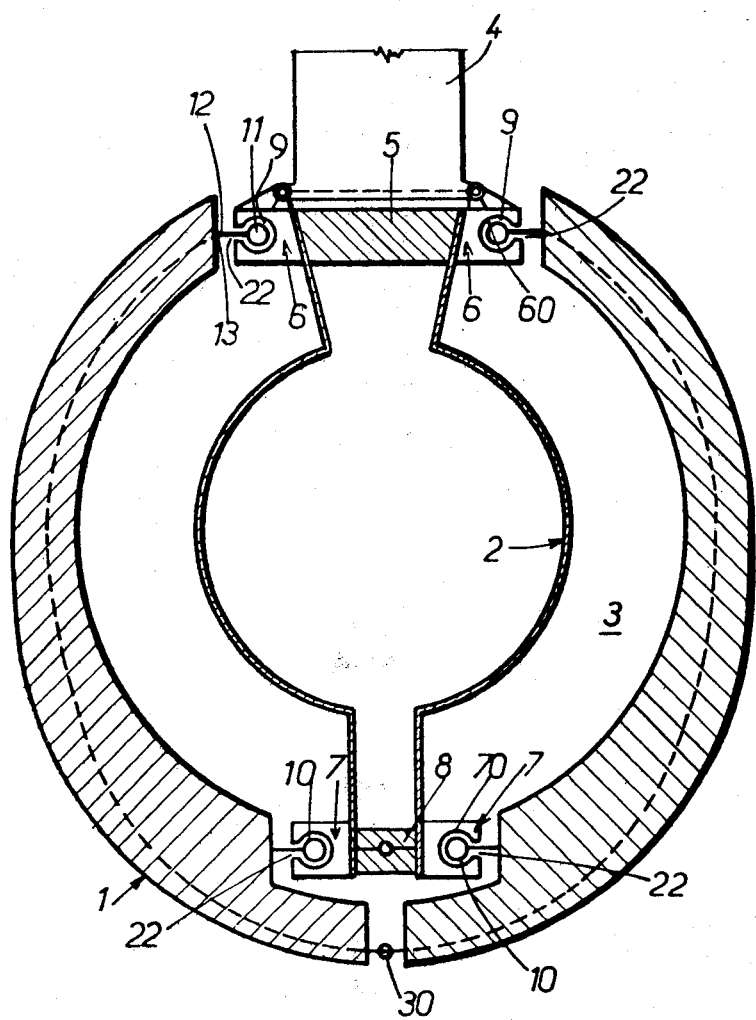
FIG. 1 is a schematic cross section of the nacelle of a jet engine in the region of the sliding part.

FIG. 1 is a schematic cross section in the region of the moving section 1 of a nacelle fairing of a turbojet engine, with only the stationary casing 2 being shown in the center part of the figure. The inner wall of the nacelle and the casing of the jet engine form an annular conduit for the secondary jet. The jet engine is fastened to the mast 4 by means of an upper framing element 5, to which are attached or wherein are provided the guiding pieces 6. Guiding pieces 7 are also provided on the lower framing element 8. The guiding pieces 6, 7 receive the pieces 9, 10 to be guided and which are attached to the moving section 1. According to the embodiment of the invention, the guiding pieces have a groove of circular cross section (60, 70) with its axis parallel to that of the nacelle and the jet engine. The pieces to be guided have a configuration that is complementary to that of the groove and appear in the shape of the cylindrical body 11 carrying, on a generatrix, a flange 12, the end of which is fastened to the moving part of the fairing.

Figure 1A:
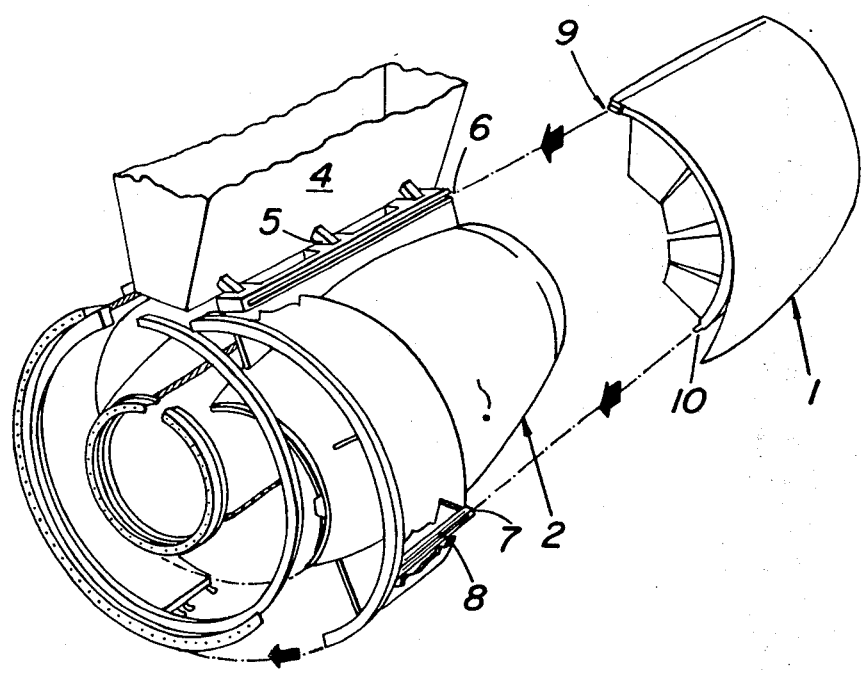
FIG. 1A is a perspective view of a thrust reverser system comprising an embodiment of the invention.

FIG. 1A is a perspective view of a thrust reverser system comprising an embodiment of the invention. The reverser system is shown in a deployed position, the moving section 1 being disassembled toward the rear.

Figure 2:
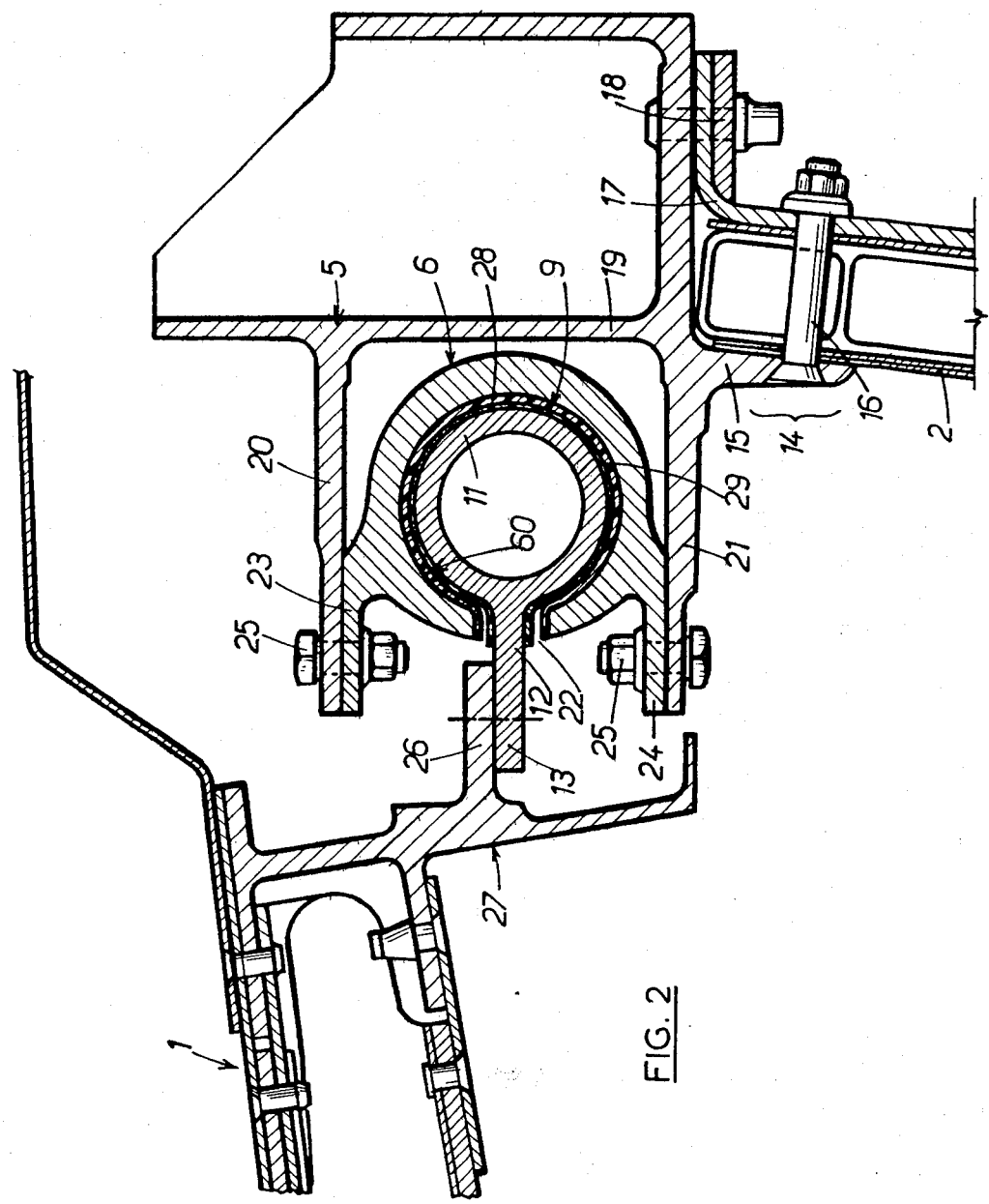
FIG. 2 is a sectional view of an embodiment of the guiding device of the invention.

FIG. 2 shows in detail an embodiment of the guiding device. Elements similar to those of FIG. 1 and FIG. 1A are identified by the same reference numerals.

The upper framing element 5 contains on its lower part, means 14 to attach it to the casing of the jet engine 2.

These means, known in themselves, consist of a flange 15 integral with the frame and a T-shaped element 17, also attached to the frame by means of bolts or screws 18, supporting by means of the bolts or screws 16 and 18 the casing 2 of the jet engine.

The framing element has on its lateral face 19, which extends parallel to the axis of the jet engine, means for the attachment of the guiding piece 6. These means consist of two flanges 20 and 21, integral with the face 19 and perpendicular to it.

The guide piece 6 is in the form of a tubular shape approximately annular in section, interrupted on generatrix by a slot 22 and carrying on places parallel to the plane of the slot, and tangent to said tube in the example shown, or at least close to it, two flanges 23, 24 provided to cooperate with the flanges 20 and 21 of the face 19 of the frame and to assure fixation. The plane of the slot 22 is approximately perpendicular to the median vertical plane of the nacelle.

The guide piece 6 forms a rail and is attached to the frame by any suitable means such as the bolts and nuts 25.

The guide piece 9 consists of a cylindrical tubular body 11 carrying on a generatrix and in a radial plane, a flange 12, one end of which is fastened by known means to the flanges 26 of the fitting 27 of the moving part of the fairing 1.

The slot 22, provided in the guide piece 6, is wider than the thickness of the flange 12 of the piece to be guided.

According to the embodiment shown, the guide piece and the piece to be guided are made of an aluminum alloy shape. In order to impove resistance to abrasion and wear and to obtain good sliding characteristics, certain measures were taken.

The inner wall and the edges of the slot of the guide piece are provided with a coating 28 of a material having good sliding properties and resisting wear, for example, a polyamide filled with molybdenum disulfide.

The piece to be guided is coated with a fluorocarbon polymer 29 having good sliding characteristics, such as, for example, polytetrafluoroethylene filled with a ceramic material.

According to the different forms of utilization of the above-cited materials:

the coating 28 of the guide piece is in the form of a molded piece which is introduced in the metal shape and is retained therein on the one hand by its radial elasticity and on the other, by means of bands fastened to the end of the guide piece. The molded piece has the configuration of a cylindrical tube slit along one generatrix, the edges of the slot being curved outwardly on radial planes;

the coating 29 of the piece to be guided is obtained either by spraying the plastic material onto the cylindrical body of the piece and a part of the flange or by the adhesive bonding of a sheet of the material.

The device described hereinabove is placed so that the plane of the flanges of the piece to be guided and the slot of the guide piece are perpendicular to the vertical plane or symmetry of the nacelle and consequently to that of the jet engine.

The moving part of the fairing is in the form of two shells separated by a vertical plane. The shells are assembled at their lower part by the mounting means 30, known in themselves, which transmit force without interruption. The broken line (FIG. 1) paralleling internally the profile of the nacelle shows the path of the compression forces in the fairing and the guide devices. It is clearly seen that by virtue of the devices according to the invention the transmission of the forces, at their level, is effected with a minimum of concentration.

Furthermore, the shape of the cooperating pieces permit limited rotation during a thrust reversal operation, while not disturbing the sliding surfaces or the tight sealing between the conduit of the secondary flow 3 and the outside.

The devices attached to the upper frame take on almost all of the weight of the moving section 1, which makes it possible to lighten the devices fastened to the lower frame, as these devices have only a guiding role.

The embodiment described hereinabove may be modified in relation to the fastening modes or the outer shape of the guide piece. It is possible to use different materials for the different pieces and, in particular, the coatings of the cooperating pieces represent matters of option.

It is also possible to invert the position of the pieces, the piece containing the slot then being carried by the moving fairing and the piece consisting of a cylindrical body and a flange, by the frame, without exceeding the scope of the invention.

What we claim is:

1. In a thrust reverser system of a jet engine having a stationary casing attached to a mast and a section of a nacelle fairing movable between a deployed position, wherein the thrust of the jet engine is reversed, and a stowed position, the improved means for slidably mounting the movable section of the nacelle fairing comprising:

(a) a pair of upper guide pieces, each guide piece defining a longitudinal groove having a generally circular cross-section and a slot extending through a wall along the length of the upper guide piece, the plane of the slot being approximately perpendicular to a median vertical plane of the nacelle;

(b) first means to attach the upper guide pieces to an upper portion of the stationary casing such that the slots open in opposite directions;

(c) a pair of lower guide pieces, each guide piece defining a longitudinal groove having a generally circular cross-section and a slot extending through a wall along the length of the lower guide pieces, the plane of the slot being approximately pependicular to a median vertical plane of the nacelle;

(d) second means to attach the lower guide pieces to a lower portion of the stationary casing such that the slots open in opposite directions;

(e) a pair of upper guided elements having generally circular cross-sections, one of the upper guided elements slidably disposed in each of the grooves in the upper guide pieces, each of the upper guided elements having a radial flange extending from its periphery through the slot in the upper guide piece;

(f) means to attach the flanges of the upper guided elements to an upper portion of the movable nacelle portion;

(g) a pair of lower guided elements having generally circular cross-sections, one of the lower guided elements slidably disposed in each of the grooves in the lower guide pieces, each of the lower guided elements having a radial flange extending from its periphery through the slot in the lower guide piece;

(h) means to attach the flanges of the lower guided elements to a lower portion of the movable nacelle portion; and, (i) friction reducing means interposed between the upper and lower guided elements and the surfaces of the grooves in the upper and lower guide pieces to reduce the sliding friction therebetween.

2. The thrust reverser fairing mounting system according to claim 1 wherein the first means to attach the upper guide pieces to the stationary casing comprises: an upper framing element attached to an upper portion of the stationary casing and the mast; and attachment means to attach each of the upper guide pieces to the framing element.

3. The thrust reverser fairing mounting system according to claim 2 wherein the attachment means comprises: at least a first flange extending from the framing element; at least a second flange extending from an outer surface of the guide piece; and, means to attach the second flange to the first flange.

4. The thrust reverser fairing mounting system according to claim 1 wherein the friction reducing means comprises a coating of friction reducing material applied to the interior surfaces of the grooves and slots of the guide pieces.

5. The thrust reverser fairing mounting system according to claim 4 wherein the coating is a polyamide filled with molybdenum disulfide.

6. The thrust reverser fairing mounting system according to claim 4 wherein the friction reducing means further comprises a second coating of friction reducing material applied to the exterior surfaces of the guided elements.

7. The thrust reverser fairing mounting system according to claim 6 wherein the second coating is a polytetrafluoroethylene filled with a ceramic material.

8. The thrust reverser fairing mounting system according to claim 5 wherein a second coating of a ceramic filled polytetrafluoroethylene material is applied to the exterior surfaces of the guided elements.

* * * * *